United States Patent [19]

Sweeney

[11] 4,261,818

[45] Apr. 14, 1981

[54] METHOD FOR MAKING SEPARATIONS FROM AQUEOUS SOLUTIONS

[76] Inventor: Maxwell P. Sweeney, 1715 Silverwood Ter., Los Angeles, Calif. 90026

[21] Appl. No.: 517,759

[22] Filed: Oct. 24, 1974

Related U.S. Application Data

[63] Continuation of Ser. No. 575,498, Aug. 25, 1966, abandoned, which is a continuation-in-part of Ser. No. 299,818, Aug. 5, 1963, abandoned.

[51] Int. Cl.$^3$ ............................................. B01D 11/04
[52] U.S. Cl. .................................... 210/642; 203/11; 210/511
[58] Field of Search ........................... 210/21, 22, 511; 202/170, 173; 203/10, 11; 260/705

[56] References Cited

U.S. PATENT DOCUMENTS

| | | | |
|---|---|---|---|
| 3,088,909 | 5/1963 | Davison et al. | 210/22 |
| 3,329,583 | 7/1967 | Othmer | 202/173 X |

*Primary Examiner*—Frank A. Spear, Jr.

*Attorney, Agent, or Firm*—Albert L. Gabriel

[57] ABSTRACT

Method and apparatus for making separations from aqueous solutions, particularly for removing water from aqueous solutions of electrolytes or other substantially non-volatile solutes, such as saline water. According to the invention, a solvent extraction process is employed which produces streams of lower and higher solute concentration in composition from an aqueous solution by contacting the aqueous solution with a solvent to produce an extract stream and a residual raffinate stream, the solvent having the property of dissolving water at a first lower temperature and substantially releasing it at a second higher temperature without substantially extracting the solute from the aqueous solution. The extract stream is contacted with a hotter aqueous reflux and thereby simultaneously heated and caused to have its content of undesired solute diminished. In addition to the heat supplied by the reflux, heat is also added to the extract stream in a plurality of stages by condensing in the extract in each stage vapors obtained by flashing previously heated streams comprising mixtures of water and the solvent.

14 Claims, 4 Drawing Figures

METHOD FOR MAKING SEPARATIONS FROM AQUEOUS SOLUTIONS

HISTORY OF THE APPLICATION

This is a continuation of my co-pending U.S. application Ser. No. 575,498, filed Aug. 25, 1966, which in turn was a continuation-in-part of my co-pending U.S. application Ser. No. 299,818, filed Aug. 5, 1963, both now abandoned.

This invention relates to a method and apparatus for making separations from aqueous solutions, particularly to removing water from aqueous solutions of electrolytes or other substantially non-volatile solutes, such as saline or brackish water.

While it has been proposed from time to time to use solvent extraction methods to remove water from aqueous solutions, the cost of water from these has been excessive and, thus, no truely practical method has been devised.

It is therefore an object of the present invention to provide a new, improved, and more economical method for large-scale separation of water from aqueous solutions.

It is another object of the present invention to provide a new, improved and more economical method for large-scale separations of aqueous solutions into solute-rich and solute-lean streams.

It is still another object of this invention to provide improved methods and apparatus whereby saline water may be economically converted to fresh water.

It is a further object of the invention to provide improved large scale means whereby a dilute aqueous solution may be concentrated.

Still another object of the invention is to provide an improved solvent extraction method for the demineralization of saline waters.

A still further object of the invention is to provide a novel process for countercurrent heat exchange between two or more streams in which a very high fraction of the possible heat is transferred between the streams.

It is an additional object of the invention to improve solvent extraction processes in which the solubility of the primary extracted substance varies with temperature, and there is a substantial heat of solution.

It is a further object of the invention to more usefully utilize potential energy in steam at higher temperatures in a desalination process without the necessity of heating the saline water or brine to such higher temperatures, thereby avoiding well known problems of precipitation and corrosion.

It is still a further object to simultaneously obtain additional recovery of solvent from a solvent extraction process and to deaerate the feed to the process.

In a principal aspect, the invention relates to a method for removing water from aqueous solutions of substantially non-volatile solutes, usually electrolytes, wherein water is preferentially extracted into an added solvent, and the extract so formed is then contacted with a hotter aqueous reflux, thereby simultaneously being heated and having its content of undesired solute diminished. Preferentially, in addition to the heat supplied by the reflux, heat is also added from another source. In general, there are a multiplicity of such reflux-extract contacts in the process of this invention, usually in separate stages or cells. In a preferred embodiment, the additional heat utilized is absorbed directly into one or both of the liquids, thus, contacted by virtue of the condensation of a vapor therein.

In another aspect, the invention relates to a method whereby a volatile solute may be removed from hot solution by countercurrently contacting a first solution with an extraneous vapor such as steam, successively flashing the effluent therefrom at successively lower pressures, and passing the successive vapors from said first solution through a second solution, thereby removing said volatile solute from both solutions.

In still another aspect of the invention, the successive vapors obtained by flashing the hot solutions at successively lower pressures serve as the additional heating medium for the heating of the extract containing water removed from the initial aqueous solution.

In an additional principal aspect, the invention relates to a method for solvent extraction wherein the entire extract phase which separates after contacting a liquid mixture with a stream comprising solvent (the lean solvent stream) is heated by heat exchange relationship with the hotter lean solvent stream, and the raffinate stream from the extraction simultaneously heated and further extracted by countercurrent direct contact with the entire lean solvent stream. Furthermore, after the extract has been heated and separated into the crude product stream and the lean solvent stream, the crude product stream is cooled in heat exchange relationship with the same entire extract phase. Still further, after the raffinate stream has been heated to the desired temperature, it is cooled in heat exchange relationship to the same entire extract stream.

In this way is overcome a major difficulty with all proposed advanced desalination processes in which more than two streams are to be heated and/or cooled. In such processes, necessarily a very high fraction of the total possible sensible heat must be transferred from the stream or streams to be heated by the stream or streams to be cooled.

When, as has been proposed, there are one or more steps involved in which it is desired that stream "A" transfer a very high fraction of its sensible heat to stream "B", a severe difficulty arises due to unavoidable fluctuations in the control of the relative flow rates of the streams. If the amount of hotter stream "A" is (temporarily) insufficient relative to "B", "B" cannot be heated to a temperature close enough to the initial temperature of "A", and if (temporarily) stream "B" is insufficient relative to "A", "A" cannot be cooled to a temperature sufficiently close to the initial temperature of "B".

Now, it is the fundamental nature of control systems that a correction to an improper value of the controlled variable cannot be made until after the variable is already in error, and in processes where the quantity of stream "A" relative to stream "B" must be controlled, it is impossible to attain the theoretical thermodynamic potential of the method.

In the present invention, this difficulty is solved by maintaining the total of all streams to be heated in constant, simultaneous heat exchange relationship with the total of all streams to be cooled. Furthermore, since the total streams to be heated equal the same returning streams which are now to be cooled, the total streams are always in proper proportion to each other. Minor fluctuations, as for example between the proportion of raffinate and extract, are inconsequential since they are both being heated in constant, simultaneous heat exchange relationship with the same streams being cooled.

Thus, this invention provides a substantial enhancement of the efficiency of processes in which there is a substantial heat of solution and in which the amount of the primary extracted substance varies significantly as the temperature is changed. This will be understood since during the heating of extract enriched with dissolved extracted substance (e.g. water in desalination by solvent extraction) the extract phase releases previously extracted substance and, in doing so, absorbs heat from the surroundings, which is the converse of the heat given off during the previous solution. Thus, by directly contacting the raffinate at each temperature step with all the lean solvent, the maximum amount possible of the extracted substance is dissolved in the lean solvent at the highest possible temperature. Then, by placing the entire streams in heat exchange relationship to each other, the heat of "unmixing" required by the extract being heated is released by the heat of solution of the dissolving extracted substance to the maximum extent possible. Thus, the overall heat requirement of the process is reduced.

In a further aspect, the invention relates to a means for obtaining a relatively high degree of concentration of the brine without brine recirculation and without heating saline materials to high temperatures, wherein the lean solvent stream after separation from the crude product water is flashed at successively lower pressures, which further removes water from the lean solvent stream as it cools, making its water content lower. By conducting at least a portion of such an operation at temperatures above the highest temperature to which it is desired to heat the saline concentrate, not only is the total capacity of the lean solvent for dissolving water enhanced (thereby reducing solvent circulation rate required), but also the power of the lean solvent for removing water from the saline concentrate is enhanced (thereby drawing water from the saline concentrate even up to relatively high brine concentrations).

Furthermore, by condensing this flash vapor from the lean solvent into the extract stream which is now relatively far along in the process, this water enhances production at low incremental cost.

In another aspect, the invention relates to a means for further recovering solvent and simultaneously deaerating the saline feed, wherein at least a portion of the product streams are introduced to a zone maintained at relatively low pressure such that vapor flashes from the product streams. This flash vapor comprises steam and residual solvent. Saline feed is introduced into the zone, and by virtue of its lower temperature, condenses therein most of the flash vapor, and is thereby heated. Thus, by countercurrent action, the dissolved gases in the saline feed are removed to lower values and additional solvent is recovered by solution in the saline feed.

These and other features of the invention are further described by reference to the accompanying drawings which, for the sake of specificity, apply particularly to the desalination of sea water. However, it is to be understood that the scope of the invention, as defined in the claims, is not thereby limited.

Figure 1:
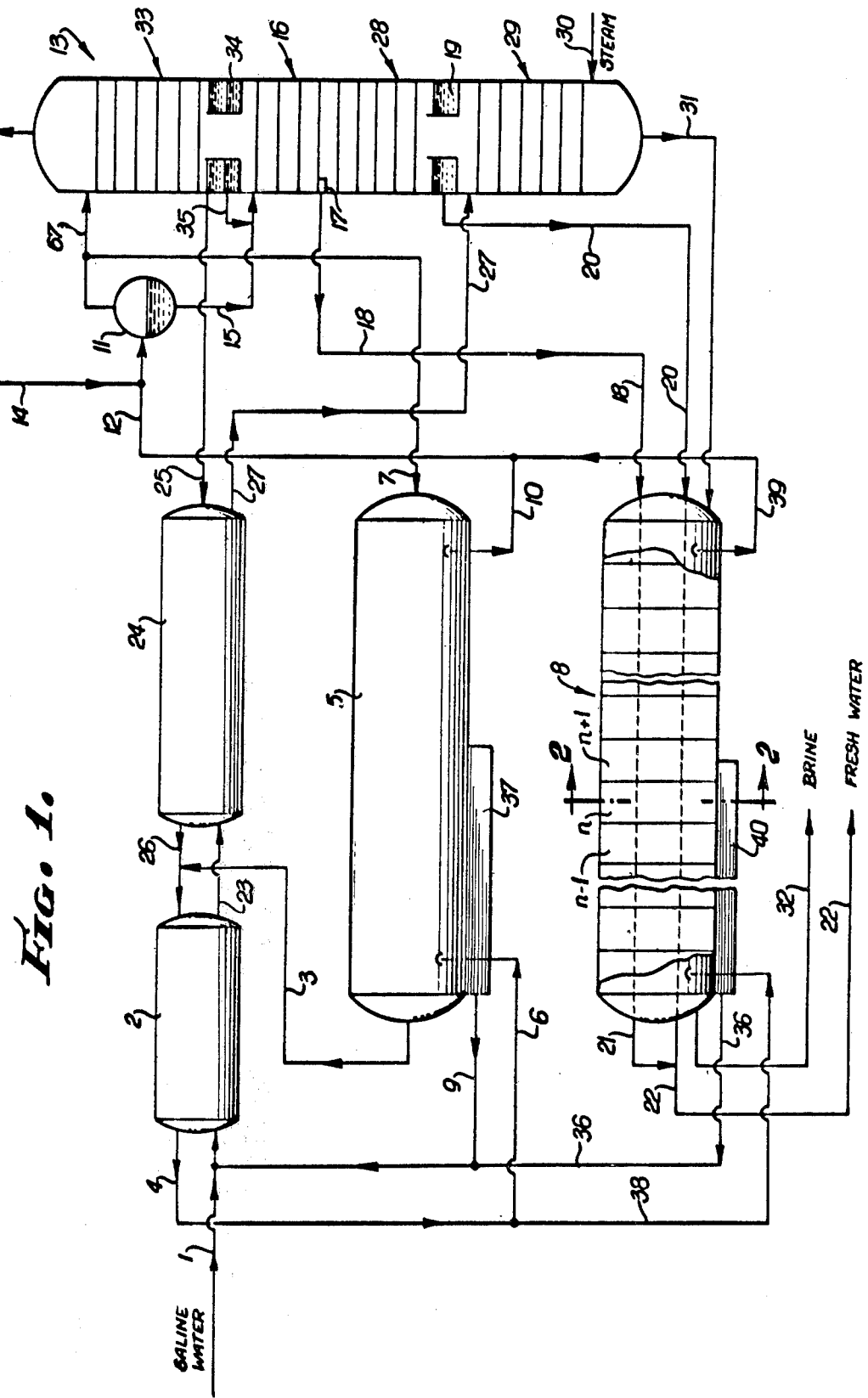
FIG. 1 is a partially schematic representation of an embodiment of the invention in which sea water is converted to fresh or potable water and concentrated brine.

Referring now to FIG. 1, saline water (preferably at least partially deaerated) enters the process via line 1 into liquid-liquid contactor 2, where it is preferably contacted countercurrently in multiple stages with the solvent entering through line 3. A typical sea water entering temperature would be 63° F. The preferred solvents used in the process have the property that their heat of solution with water is relatively quite small. The water extract leaving contactor 2 via line 4 can, therefore, be at a temperature lower than about 75° F., thus maximizing the carrying capacity of the solvent for water. A portion of the water extract from line 4 enters vessel 5 via line 6. In vessel 5 hot recirculated solvent entering through line 7 is cooled by multiple flashing, and successive vapors therefrom are condensed successively into the countercurrently flowing extract stream entering through line 6.

It is to be emphasized that this operation is not only highly advantageous from the point of view of high heat transfer rates, the elimination of the requirement for metallic heat transfer surfaces and the resulting low temperature differences permitted thereby, but also that transferring mass from the hot solvent stream to the extract stream is peculiarly advantageous. In the preferred solvents, water has a relatively high volatility, thus the vapors therefrom contain a high proportion of water. This water vapor, upon condensation into the extract stream, increases the water production from that stream. Furthermore, the carrying capacity of the solvent as it leaves vessel 5, by virtue of the removal of water therefrom, has been increased, thereby requiring a smaller solvent circulation rate for a given water production than otherwise would have been required.

Referring again to FIG. 1, simultaneously with the operation described above, in the first portion 37 of vessel 5, aqueous reflux which is self generated from the water extract stream entering through line 6 as it is being heated by condensation therein of the vapors from the cooling recirculated solvent stream, is passing in countercurrent contact with the extract stream. The means by which these simultaneous operations are preferably carried out are similar to those described in greater detail below in reference to vessel 8 and FIGS. 2 and 3. As the extract stream in vessel 5 is heated and washed of its remaining salt content by the aqueous reflux stream leaving through line 9, a point is ultimately reached where this stream is substantially free of salt. While the properties of the solvent are such that as this stream is further heated, additional water is released, no further need for refluxing exists and the entire stream is carried in the forward direction, ultimately leaving flash vessel 5 via line 10, and enters separator 11 via line 12, after being further heated by condensation therein of vapors from tower 13 via line 14. After settling in separator 11, line 15 removes the lower, aqueous layer containing a relatively small amount of solvent, and passes it to second section 16 of tower 13, where it is partially stripped of its solvent content by vapors rising countercurrently therein. Then, preferably, a portion of said aqueous stream is removed from tower 13 via sidedraw 17 and line 18. The remainder of said aqueous stream, after further countercurrent stripping in third tower section 28, is removed from tower 13 via accumulator 19 and line 20.

The water streams in lines 18 and 20 enter vessel 8 where they are successively flashed and simultaneously finally stripped of their remaining solvent content, while simultaneously being cooled, and ultimately leave via lines 21 and 22 respectively, as more fully described below. Line 21 joins line 22, the combined stream being the product fresh water.

The more concentrated saline water remaining after the extraction therefrom of water in contactor 2 emerges via line 23, whereupon it passes into vessel 24, in which it countercurrently contacts hot solvent entering via line 25, preferably by multiple stages. In this way, while hot solvent is cooled by this highly efficient direct heat exchange action, also by virtue of its direct contact with the more concentrated saline water being heated, it further extracts water therefrom. The cooled, water enrichened solvent stream leaves via line 26, which joins the main solvent stream moving through line 3 into contactor 2.

The resulting brine leaves vessel 24 via line 27, which conveys it to lower tower section 29, in which it is stripped of its solvent vapors by countercurrent contact with steam entering through line 30. It then passes out of the bottom of tower 13 via line 31 and into vessel 8 where it is flashed successively, thereby being cooled and ultimately leaving as product brine via line 32.

It is to be noted and emphasized that in addition to the water removed in contactor 2 and vessel 24, further water production is obtained from the brine and it is further concentrated, by virtue of the flashing operations in vessel 8. It is further to be emphasized that not only do these vapors increase water production but they are the means whereby the product water is finally stripped of its solvent content, as more fully explained below.

It is also to be noted that the vapors rising in tower 13 progressively pick up more solvent vapors and release water as condensate, as they rise through tower sections 29, 28, 16 and upper section 33. In upper section 33, to the top of which is fed hot solvent from separator 11 via lines 7 and 67, preferably a partial separation takes place between components of the solvent. In the preferred embodiment herein described, the fraction of the solvent having the greater ability to extract water is the less volatile and leaves the tower via line 25, after being separated from concomittant aqueous phase which settles out in accumulator 34. This aqueous phase leaves tower 13 via line 35, which joins line 15, thereby still further increasing water production.

While a large portion of the water extract stream in line 6 is heated in vessel 5, a second portion adequate for the heat exchange requirements of the product streams leaving through lines 22 and 32 (as well as to that of the aqueous reflux stream leaving in line 36) is introduced into vessel 8 via line 38. In vessel 8 it is heated, and simultaneously washed free of salt, ultimately emerging via line 39, which joins line 10 for phase separation in separator 11. As mentioned above, the product water and brine streams leaving vessel 8 via lines 21 and 22, and line 32, respectively, have therein been cooled and, in the case of the water streams, simultaneously denuded of their remaining solvent content. Preferred means whereby all these operations are carried out simultaneously may be described by reference to FIG. 2, which shows a cross section of a typical cell in first portion 40 of vessel 8.

Figure 2:
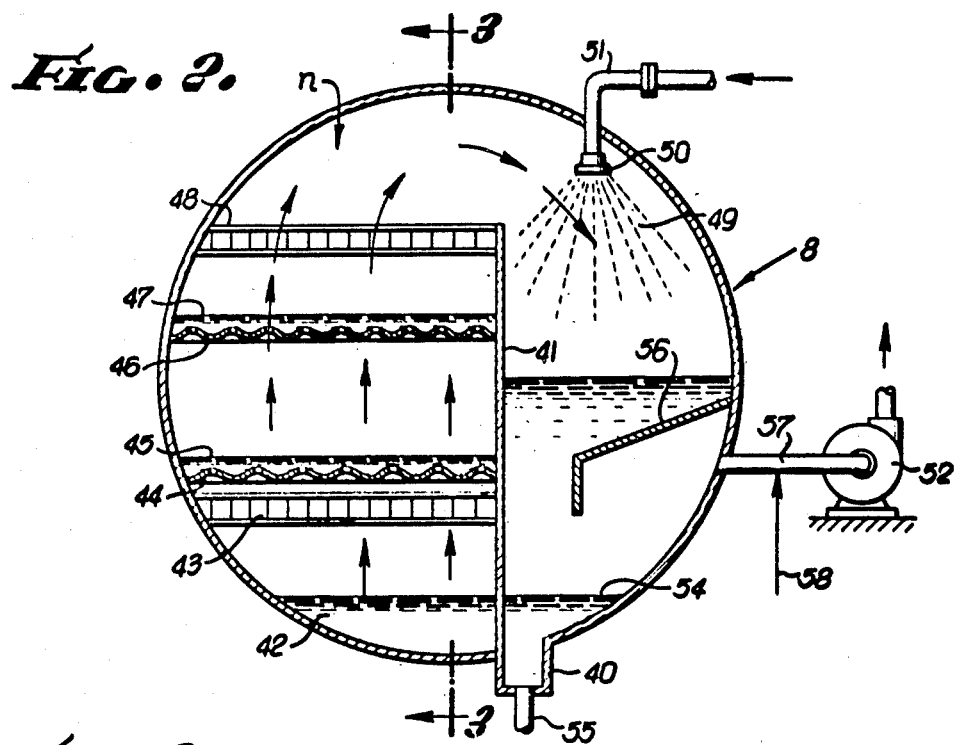
FIG. 2 is a cross section of a process vessel along the line 2—2 of FIG. 1.

Visualizing the cells to be numbered starting at the cold end of vessel 8, the cell shown in FIG. 2 may be denoted the nth cell. The circular cross section of each cell of vessel 8 is divided vertically by a baffle such as baffle 41. Shown on th left side of baffle 41 is a flashing brine stream 42, which came from the n+1th cell. Vapors rising therefrom, preferably after passing through entrainment separator 43, pass through distillation tray 44. Preferably, this plate is comprised of corrugated metal with small holes in the upper portions of the corrugations for the vapors to pass through. The vapors thereby contact liquid 45 thereon, which is relatively low in solvent content, and which has also come from the n+1th cell. Thus, the vapors from brine 42 still further reduce the solvent content of liquid 45. The vapors rising from liquid 45, including those flashed directly from liquid 45, pass through tray 46, preferably of similar construction to that of tray 44, thereby stripping solvent from liquid 47 thereon. Liquid 47 has also come from the n+1th cell, and is relatively higher in solvent content than that of liquid 45. Vapors therefrom, including those produced by direct flashing of liquid 47, preferably after passing through entrainment separator 48, cross over the top of baffle 41, thereby coming into contact with liquid 49 issuing from distributor 50 at the end of pipe 51. Liquid 49 is primarily composed of water extract from the discharge of a pump taking suction from the n−1th cell similar to that of pump 52 which is shown taking section from the nth cell. If desired, for additional vapor contacting purposes, the volume of water issuing from distributor 51 may be enhanced by recirculating liquid from pump 52 directly back to pipe 51.

The vapors from liquid 47 condense, therefore, by contact with liquid 49 and the combined stream settles out in accumulator section 53. (Fixed gases in the condensing zone are minimized by a bleed vent now shown.) In the first portion 40 of vessel 8, where aqueous reflux is passing, the aqueous reflux settles out into a phase such as phase 54, is withdrawn through a nozzle 55, from which it is preferably conveyed to the suction of the pump (similar to pump 52) which is taking suction from the n−2th cell. In that pump aqueous reflux and water extract are intimately contacted and sent to its appropriate cell where it first contacts vapors in a manner similar to that shown for liquid 49, etc.

After settling aqueous reflux therefrom in the compartment to the right of the baffle 56, water extract is removed via line 57, intermingled with aqueous reflux from the n+2th cell entering line 57 via line 58, and discharged to the n+1th cell.

Figure 3:
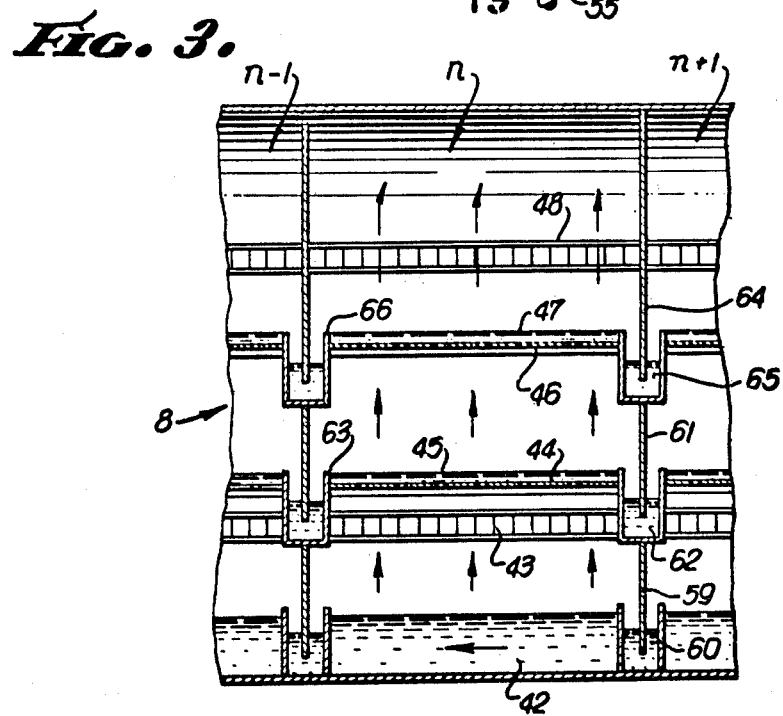
FIG. 3 is a partial cross sectional view of a cell along the line 3—3 of FIG. 2.

To further clarify these operations, FIG. 3 shows a partial sectional view of the left side of the nth cell shown in FIG. 2. Brine liquid enters the nth cell below underflow weir 59 and liquid trap 60, then it flashes vapor therefrom which passes up through tray 44. Relatively-low-solvent-content-liquid 45 enters below underflow weir 61 and liquid trap 62. Its height is maintained on tray 44 by overflow weir 63. Similarly, liquid 47 enters below underflow weir 64 and liquid trap 65, and its height is maintained on tray 46 by overflow weir 66.

The preferred details of contactor 2, and vessels 24 and 5 may now be stated succinctly as follows. Contactor 2 and vessel 5 are multistage liquid-liquid contactors, preferably using a pump from each stage to induce the flow of the saline stream passing through lines 1, 23 and 27, while the other stream flows countercurrently, for example in the manner described with respect to the aqueous reflux stream leaving through line 36.

In vessel 5 exactly the same operations are carried out as, and preferably in a similar manner to, those in vessel 8 except that the distillation trays, such as trays 44 and 46 as shown in FIGS. 2 and 3, may be eliminated without compromising the advantages of the basic process.

At the same time, in the circumstance that the dissolved water content of the solvent flowing in line 7 is quite substantial, it will now be seen that a lower water content stream of solvent than that of the solvent in line 7 may be introduced into the lower section of vessel 5 in a corresponding position to that of liquid 42 as shown in FIGS. 2 and 3, and that solvent in line 7 may be introduced on to a tray, such as tray 44 or 46, thereby further reducing the water content in the solvent in line 7. For example, a sidedraw may advantageously be installed in upper section 33 of tower 13 to remove a portion of the solvent phase which is down-flowing therein, which contains a lower water content (by virtue of its higher temperature) than the solvent in line 7, and it may serve as such a bottom-flowing liquid, its vapor helping to strip water from solvent on the successive trays above.

It will now be seen that the aspects of this invention combine together in a manner uniquely efficient and effective and that the method employs each piece of equipment simultaneously to perform several advantageous functions. Together the various aspects of the invention lead to a lower steam requirement than any that has been heretofore disclosed. Because of the complete elimination of metallic heat exchanger surface requirements, the capital requirements will continue to decrease relatively rapidly as the design throughout is increased.

Also, because of the elimination of such surface through the use of direct contact exchange, and vapor flow transfer, of heat, extraordinarily low driving force differences are economically realizable. It will therefore become clear to those skilled in the art that the steam requirements are mainly those necessary for only the solvent stripping requirements of the brine, as shown taking place in the lower tower section 29.

Furthermore, by the use of preferred solvent components, each of which has a boiling point which is within the range 110° to 160° C., such as a mixture of alkyl pyridines (e.g. lutidines) and a diether (e.g. 2-methoxy tetrahydropyran), the relative volatility of the solvent present at low concentrations in the brine is greater than about 20. The brine stripping steam requirement may therefore be kept to less than 8% of the brine throughput.

It will also become clear that as the ratio of brine to product water is varied, negligible solvent losses in the product streams may be maintained at comparable levels by varying the number of intermediate sidedraws and lines such as 18 leading to similarly intermediately juxtaposed trays in vessel 8 relative to that of tray 44. Thus, if the ratio of product fresh water to brine is low enough, and the number of cells in vessel 8 large enough, the intermediate stream in line 18, etc., becomes unnecessary, and, conversely as the ratio of product fresh water to brine is increased, adequate solvent stripping from the product water streams still is possible, in spite of the lowered steam requirements for stripping the brine in lower tower section 29, and the lowered relative amounts of successive vapors from said brine stream as it cools, by utilitzing more than one intermediate stream similar to that shown in connection with line 18, etc.

Thus, since the ratio of product water to brine may be at least 1.6 without appreciable solvent losses, it will be found that it is now feasible and economically advantageous to produce in excess of 1.6./0.08 or 20 pounds of product water for each pound of steam required to enter the process.

Still further, it is seen that the elimination of heat transfer through metallic tubes has eliminated the recurrent problem of fouling by precipitates resulting from certain components entering in the usual saline waters. It is now clear that by careful choice of solvent components, major precipitation of, for example, magnesium hydroxide is avoided, and some slight precipitation of minor components in usual saline or brackish waters, such as calcium carbonate, can occur without deleterious effect.

To still further minimize deleterious effects, it is clear that some of such precipitates in the product brine leaving the process via line 32 may be settled therefrom and injected into the stream entering the process at line 1. As is well known, this would have the effect of causing further deposition almost entirely on such precipitated nuclei. This sludge would then pass harmlessly along with the brine throughout the process.

It may also prove to be advantageous instead of allowing release of $CO_2$ within the flash cells, due to incomplete removal of bicarbonate $CO_2$ in the deaeration step (not shown), to add a relatively small and controlled amount of a strong base such as quicklime to the stream prior to its entering the process at line 1, but after deaeration. This would have the effect of precipitating bicarbonate $CO_2$ as calcium carbonate, and, by carrying such precipitates along in the stream, will readily eliminate the need for calcium carbonate sludge recycle. Such an addition, it will also be found, will still further increase the volatility of such moderately basic solvent components as alkyl pyridines, owing to the lack of tendency at the higher pH values so obtained in the saline water to be released into the aqueous phases as salts of the bases, thereby hampering their stripping therefrom.

Figure 4:
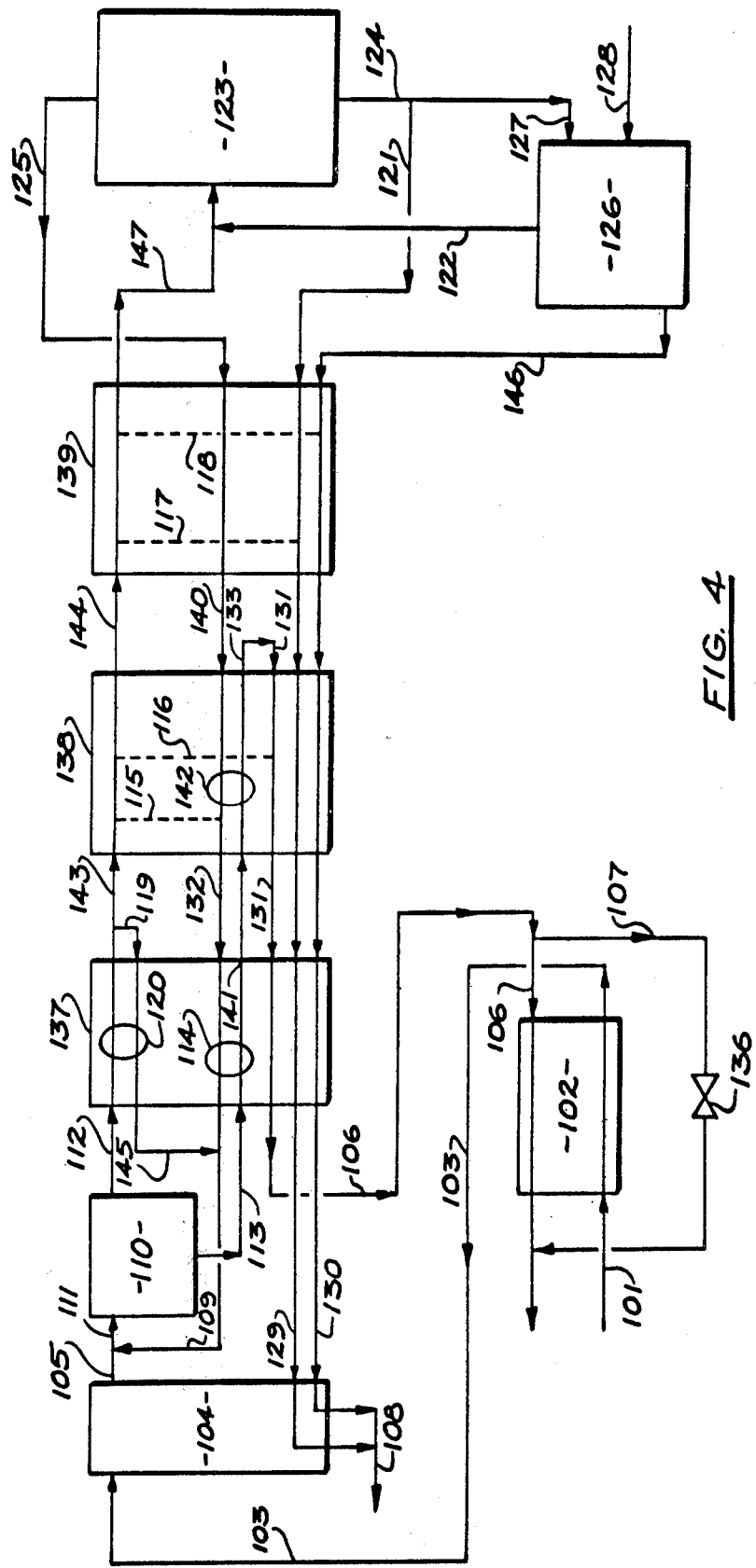
FIG. 4 is a simplified flow diagram of another, and preferred, embodiment of the invention.

Referring now to FIG. 4, saline feed in line 101 is preferably passed through preheat exchanger 102 where it is warmed by indirect contact with brine flowing into the exchanger through line 106. The heated feed then passes to deaerator 104 via line 103. Therein vapors, preferably flashing from product water streams entering through lines 129 and 130 and emerging via line 108 strip gases from the feed and by condensation therein further preheat the saline feed which emerges via line 105. The deaerator 104 is, of course, arranged to permit gases to be withdrawn therefrom by means not shown.

The final preheat temperature (with somewhat varying natural saline feed temperature in line 101) is preferably controlled by varying the proportion of the brine product passed through line 106, the remainder passing through bypass line 107 which is controlled by valve 136.

The preheated saline feed in line 105 mixes with solvent and reflux from line 109 and the mixture enters extractor-settler 110 via line 111. Water preferentially dissolves in the solvent, leaving the raffinate more concentrated in saline solute. The raffinate and extract phases, after settling, pass from settler 110. (Enriched extract in line 112 and saline concentrate in line 113.)

As with the embodiment of the invention illustrated in FIG. 1, the various streams are in vapor phase transfer relationship with one another for the purposes of selectively heating, cooling, stripping and condensing between the process streams. In the schematic representation shown in FIG. 4, each of the vessels 137, 138 and 139 contain a plurality of separate stages in which some of the streams are actually in countercurrent liquid to liquid direct contact (permissible due to their partial immiscibility) and some of the streams are in vapor contact with others so that by partial vaporization of the relatively hot stream, vapors are "forced" through some other stream, helping to strip volatile components therefrom, and vapors are selectively condensed in other streams. Thus, in the plurality of stages there is a simultaneous process of countercurrent and co-current heat transfer and mass transfer both by liquid to liquid contact and by vaporization coupled with vapor contact and condensation.

Thus, an apparatus similar to that disclosed in FIGS. 1, 2 and 3 can be employed to conduct the embodiment of FIG. 4. It is also possible to combine all the unit operation of the embodiment of FIG. 4 into a single multicompartment multistage vessel having appropriate compartments and interstage pumps.

Thus, the concentrate stream in line 113 enters the series of transfer stages in the vessel 137 where it is heated and simultaneously further concentrated in its saline content by countercurrent contact with the lean solvent stream which enters the vessel section 137 via line 132. In a plurality of stages in the vessels 137 and 138, the concentrate is contacted countercurrently with solvent flowing in the other direction. The two phases are separated at each stage and each is taken to a subsequent stage in its direction of flow in the same fashion as has been described in connection with FIGS. 1 through 3. The contacting operation is illustrated symbolically by the circles 114 and 142 in segments 137 and 138.

The lean solvent (from a separation step to be described later) enters the vessel section 138 through line 140, while the concentrate "turns around" and flows back through the section 138 and 137, in vapor contact only with the remaining streams at each stage.

It is preferred that the brine in line 131 not contact the other streams in the stage from which it was withdrawn, but is returned to the vapor contact one or more stages downstream toward the effluent line 106.

It is to be emphasized that not only is water drawn into the lean solvent stream as it enters the section 138 by virtue of its initial power to abstract water in its relatively "dry" condition as it first contacts saline concentrate (which in turn was obtained by flashing vapors of relatively high water content from the stream in section 139 at temperatures above that at point 133), but also that additional water continues to be drawn from the saline concentrate by virtue of the lean solvent continuing to lose water by flashing vapors from it at successively lower pressures.

This vapor (predominately water) condenses directly into enriched extract (which has entered the stages in vessel 137 by line 112) at each stage (shown symbolically by dotted line 115 in segment 138), thereby both heating and enriched extract and adding to its water content. It is to be understood that this vapor transfer also takes place in the segments 137 and 139.

After the saline concentrate in line 113 has been heated by countercurrent contacting with lean solvent in lines 132 and 140 to a temperature of 150° to 350° F., preferably 180° to 220° F., it is removed from this contacting and in the preferred embodiment cooled by successive flashing from the stream in line 131 as it returns, stage by stage, through segments 138 and 137 and finally emerges through line 106.

In this stream, not only is the brine cooled, but as further explained below, residual solvent is recovered from it. Still further, the flash vapors (shown symbolically as dotted line 116 in segment 138) being predominantly water, further concentrate the brine and substantially increases water production throughout segments 137 and 138.

The water-enriched extract is successively heated in countercurrent transfer sections 137, 138 and 139 in a multiplicity of stages in which vapors from the various streams (shown symbolically by dotted lines 115, 116, 117 and 118) condense in the extract flowing through the stages in the lines 112, 143 and 144. The vapors are predominantly water and thereby still further enhance the water content of the enriched extract.

By virtue of the property of the solvent of decreased solubility with increased temperature (and the water vapors condensed therein just referred to) a separate water reflux phase is generated in the initial stages in segment 137 from the enriched extract as it is heated from stage to stage. For the first few stages, this water reflux, as shown schematically by line from 119 to 145, is separated from the extract and returned to solvent in line 109 with countercurrent contacting through each stage (symbolically shown by the circle 120 embracing the two streams) with the extract in line 112. The aqueous reflux strips the stream in line 112 of the relatively small amount of salts initially dissolved along with water in the enriched extract from settler 110. The effluent reflux in line 145 is returned to vessel 110 along with solvent in line 109.

After the enriched extract passes from segment 137, the water phase produced by further heating is no longer passed countercurrently, but is heated along with enriched extract phase by condensation therein of flash vapors shown symbolically in line 115 through 118. The two phase stream in line 147 is heated to a final temperature of about 200°–400° F., preferably 280°–320° F. by vapors from line 122 condensing therein after it leaves the segment 139. The two phase system flowing into separator 123 consists of a primarily solvent phase and a primarily water phase. The crude water product stream is then settled to separate product from the lean solvent stream in settler 123. Water is taken from the separator 123 via line 124 and solvent is taken out via line 125. The lean solvent entering segment 139 through line 125 contains some residual water. This water is partially vaporized in the transfer stages in the segment 139 wherein the solvent is flashed down in temperature to somewhat (preferably 2°–10° F.) above the temperature in the last stage in line 140 and 133 of segment 138. It should be noted that the initial contact of the hot lean solvent in segment 138 with the residual raffinate stream is a temperature at least about 50° F. higher than the initial temperature of the raffinate in line 113. This is in distinction to prior art extraction schemes using this type of solvent in which it has been assumed that best results are obtained if the extraction is isothermal. It is thus unexpected that higher yields of extract can be obtained ultimately by such a step in the process.

A portion of the products, preferably a portion of the crude water, is passed to stripper 126 via line 127. Steam, entering stripper 126 via line 128, strips residual solvent from the crude product stream, which leaves via line 146 and passes into the countercurrent transfer segments 139, 138 and 137 where it is flashed at successively lower pressures through the stages and finally emerges through line 130 as described above.

The other portion of the water stream in line 124 is taken to the countercurrent transfer sections 139, 138 and 137 through line 121 and parallels the flow of the stream entering through line 146. The streams from lines 146, 121 and 131 are located such that flash vapors from line 146 pass in contact. The streams originating in lines 121, 131 and the vapors flashed from line 121 pass in contact with the stream in line 131. It is to be noted that no vapor from other streams pass through the liquid entering the transfer stages through line 125 and 113 (until the brine phase is returned through line 131).

It is to be emphasized that at each stage not only do vapors flash from streams originating in lines 146, 121 and 131, and that these vapors contain a much higher content of solvent than the liquid from which is came, thus rapidly reducing the solvent content of each of these product streams. Further, the vapors from the stream originating in line 146, being of still lower solvent content by virtue of the stripping in stripper 126, further strips solvent from streams originating in lines 121 and 131. Furthermore, because of the tendency of liquid to flash to its equilibrium temperature (which depends on the pressure in the stage) immediately upon introduction to each stage of lower pressure, the vapors flashing in situ remove solvent content before the stripping action of the flash vapors from the stream in line 146. This sequence, repeated at each stage, produces high solvent removal efficiency, so that overall solvent recovery is extremely high. In fact, in the preferred embodiment, solvent in the final water stream 108 can be stripped to well below one part per million.

In a preferred embodiment, when desalinating sea water of about 35,000 PPM of salts, the final brine stream is about three times as concentrated as the saline feed and the product water stream is about twice the amount of the brine stream, but these can be adjusted. Thus, by dividing the water stream into two portions and stripping only one of them in stripper 126, entering fresh steam requirement for stripping (e.g. in line 128) is reduced to about ⅓ as much as it would be for conventional stripping and, other than pumping power, represents the only energy requirement of the process. Even for the stripped stream in line 130, it is now clear that the stripping requirements of steam and number of stages of conventional stripping are greatly reduced by following the conventional stripping in stripper 126 with successive flashing at lower pressures.

Still further, it is to be emphasized that in a preferred embodiment, wherein not only does flash vapor from the stream originating in line 146 pass in contact with the stream originating in line 121, but both of the vapors from streams in lines 146 and 121 pass in contact with the stream in line 131 in the segments 137 and 138. In a preferred embodiment, this stream is the reject brine stream. Thus, it is stripped of solvent content not only by its own flash vapor, but by two others. Its solvent content is thereby reduced to a relatively very low level in a relatively few stages of flashing. It will now be understood that it is now possible to obtain high efficiency of solvent recovery from the brine without either conventional stripping for solvent recovery or heating the brine to relatively high temperature, with its severe attendant and well known problems of precipitation and corrosion.

Thus, the flash vapors (symbolically shown in lines 116 through 118) are made to serve three purposes: (a) they reduce solvent content in the product streams, (b) they cool the stream by adiabatic conversion of sensible heat in the liquid to latent heat of vaporization, and (c) they heat the enriched extract stream originating in line 112 and flowing through 143 and 144 by condensation therein, thereby carrying heat from the product streams to the extract streams without requiring heat transfer through extended surface exchangers, and thereby greatly reducing the cost of desalination equipment.

It should also be noted that the stream originating in line 121 may be split into a plurality of individual streams, positioned one above the other so that vapor from the stream originating in line 146 passes first through the lowest of the 121 streams and effluent vapor from this stream passes up the next and so forth until the vapor condenses into the extract stream.

The solvent used in the process of this invention has two important properties. It must have greater solubility for water at the lower temperature found in the feed streams than it has at higher temperatures employed in the separation and stripping operation and the transfer stages.

Further, the solvent should have a greater "affinity" for water than typical inorganic solutes found in the water, thus permitting water to be extracted in preference to solutes.

Among the solvents which may be used in the process of this invention are relatively weak organic bases which ordinarily have a nitrogen atom having a pair of electrons available to complex with water.

Thus, for example, insofar as they have the desired properties, the solvents disclosed in U.S. Pat. No. 3,088,909 (Davison, et al) may be employed, as well as those disclosed in the references cited therein. These include mixtures of amines having the general formula:

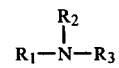

wherein $R_1$ may be hydrogen or alkyl, and $R_2$ may be alkyl or $C_3$ or $C_4$ alkenyl radicals such as allyl, methyl allyl, and butenyl, and the total number of carbon atoms in the molecule is from 4 to 7, although compounds having 5 or 7 carbons are preferred. Thus, among the amines which may be employed are: Triethylamine, Methylethylisopropylamine, Methylethyl-n-propylamine, Dimethylsecondary-butylamine, Dimethyl-tertiary-butylamine, Dimethylisobutylamine, Dimethyl-n-butylamine, Methyldiethylamine, Dimethylallylamine, Dimethyl-n-propylamine, Dimethylisopropylamine, Diisopropylamine, Di-n-propylamine, Di-allylamine, N-methyl-n-amylamine, N-ethyl-n-butylamine, N-ethyl-sec-butylamine, N-ethyltertiary-butylamine, N-ethyl-n-propylamine, N-ethyl-isopropylamine, N-methyl-n-butylamine, N-methyl-sec-butylamine, N-methylisobutylamine, N-methyl-tertiary-butylamine, Dimethyl, 1,1-dimethylpropylamine, and Dimethyl, 1-methyl butylamine. When compounds in the preferred range are employed, they may be used either as mixtures or as single compounds.

Further, the solvents employed and disclosed in Progress Report No. 22 of the Office of Saline Water, U.S. Department of the Interior, entitled "Research on Liquid-Liquid Extraction for Saline Water Conversion"

published December 1958, may be used insofar as they have the desired properties.

Although the solvent itself is broadly not a part of this invention, it has been found that there are certain classes of compounds and mixtures thereof which are unexpectedly superior when employed in the process of this invention. Thus, a further aspect of the invention comprises the use of a special type of solvent, preferably comprising, in the organic portion thereof, combined oxygen and nitrogen or either of them in addition to carbon, and such that as an extract of water in said solvent is heated, the solubility of water in the solvent decreases. The solvent, preferably, on admixture with common saline waters, such as sea water, does not cause deleterious precipitation. It has been found that certain relatively weakly basic organic compounds and their mixtures selected from those classes comprising at least one atom of nitrogen or oxygen, in addition to carbon and hydrogen, are such that they have a pH in aqueous solution of between about 7 and 10.7, such that they have a lower solubility for water as the temperature is increased from near ambient temperatures, and such that they overcome the costly difficulties with precipitation encountered by those preferred solvents disclosed heretofore which also have the property of releasing water as the temperature of water mixtures therewith is increased. It has been found that such preferred properties may be obtained if each of the major components of the solvent is selected to obey the following rules: (1) the ratio of twice the number of hydrogen-atoms-attached-to-carbon minus the number of carbon atoms to twice the number of hydrogen-atoms-attached-to-oxygen-or-nitrogen plus the number of carbon-atoms-attached-to-oxygen-or-nitrogen in a solvent molecule is less than about 6 and more than about 3.5; (a carbon atom which is double bonded to 0 or N is counted twice); and (2) the ratio of the number of other atoms minus $\frac{1}{4}$ the number of hydrogen atoms of nitrogen in a solvent molecule is greater than about 3.0. Furthermore, considering the organic solvent as a whole, and proportionately weighting the components thereof, it shall have a composition such that it obeys rule (1) preferably between about the limits 3.8 to 5.2 for the ratio cited. Preferred solvents are mixtures of two or more such compounds; for example, alkyl pyridines along with a component or components containing oxygen. Preferred oxygenated organic compounds include diethers, ether-ketones, alcohol-ethers, and compounds containing both oxygen and nitrogen attached to the same or vicinal carbon atoms. In addition, for the embodiment cited herein, it is preferred that the boiling points of each of said components be greater than about 100° C. and less than about 180° C. Examples of such preferred solvent components include lutidines, some of the lower alkoxy alkyl tertiary amines, some of the N-alkyl morpholines and homologues, methoxy derivatives of mesityl oxide, methoxy tetrahydropyran, some of the lower dialkoxy derivatives of ethane and propane, and the lower alkyl dioxolanes. It will be seen that all the preferred solvents are characterized by the tendency towards miscibility with water near ambient temperatures, only partial miscibility at higher temperatures and the phenomenon that their pH in aqueous solutions is less than about 10.7 and greater than about 7. In still a further aspect of the invention, the solvent comprises a mixture in which at least one component substantially differs from that of another in both volatility and the ability to extract water from aqueous solutions. Then, by fractional distillation, a component or a mixture of said components is at least partially separated from other components of said solvent, and the fraction having the higher water extracting powers is contacted countercurrently with increasingly saline brines. Preferably, in addition, in so doing the brine is heated and the solvent is cooled. In this manner, additional water is recovered from the brine as it is heated by direct contact with the said solvent fraction.

To simplify and clarify the above discussion, it should be pointed out that it is preferred that the organic base employed have a pH in water solution of from about 8 to about 10.7. In some instances, bases having higher pH can be employed if it is desired to precipitate such compounds as Mg (OH)$_2$ from the aqueous solution or if the solution is initially substantially free of material which precipitates at high pH.

Thus, acyclic amines containing ether oxygen may be employed as the extraction solvent. These may contain a single ether oxygen atom bonded to carbon and the oxygen should be separated from the nitrogen by two carbon atoms and preferably contain from 5 to 7 carbon atoms. These include, for example, N-(isopropoxyethyl) dimethyl amine, N-(ethoxyethyl) dimethyl amine, N-(methoxyethyl) diethyl amine, N-(methoxypropyl) dimethyl amine, N-(isopropoxymethyl) dimethyl amine and the like.

Another class of compounds which can be employed are compounds containing two oxygen atoms and which are composed of C, H and O only and have from about 5 to about 7 carbon atoms. In these compounds, at least one of the oxygen atoms is either an ether or a ketonic oxygen (that is it is double bonded to a carbon atom having no hydrogen). If the other oxygen is alcoholic, then it is preferred that the compound have seven carbon atoms. Among these compounds are; 2,5-heptadione; 2-methoxy, 2-methyl pentanone-4; 2-methoxy pentanone-4; 1-ethoxy butanone-3; 2-methoxy 2-methyl pentanol-4; 2-tetrahydrofurfuryl methyl ether; dimethoxypropane; dimethyl 1-4, dioxane; methoxy tetrhydropyran; and the like. Another and particularly preferred class of extraction solvents applicable to this invention include heterocyclic compounds which contain secondary or tertiary nitrogen (that is, nitrogen bonded only to carbon and no more than one hydrogen) and heterocyclic compounds which contain oxygen. Ordinarily, because of solubility limitations, heterocyclic compounds having from 6 to 8 carbon atoms are employed in the process of this invention. These may have 4 or 5 carbon atoms in the ring and may also contain oxygen as either a ring or side chain constituent, and will have from 0 to 1 nitrogen atoms in the compound and from 0 to 2 oxygen atoms in the compound such that the total of oxygen and nitrogen atoms in the compound is no less than one and no more than two.

It is also preferred that when the compound contains oxygen, and nitrogen, that the nitrogen is separated from oxygen by two carbons and the oxygen is bonded only to carbons. This preference applies to both the acyclic compounds described above and the heteracyclic compounds, including the following; N-furfuryl dimethyl amine; lutidine (all isomers); tetrahydrofurfuryl methel ether; dimethyl dioxane (1,4); methoxy tetrahydropyran; 2,5-dimethyl oxazole; N-methyl-2, 2-dimethyl oxazolidine; picoline (all isomers); the lower alkyl substituted morpholines having from 2 to 4 carbon atoms in from one to four side chains; the lower alkyl substituted pyridines having up to 3 carbons in from one to three side chains, n-methyl morpholine derivatives having up to eight carbon atoms, n-ethylmorpholine and its alkyl substituted derivatives, and the like.

Although some of the individual compounds named above are not well suited for use in the process by themselves because of solubility considerations, they may be employed in mixed compound solvents so long as the ratios and carbon atom limitations given above are observed.

When mixtures of compounds are used, heterocyclics having from 6 to 8 carbon atoms may be employed as constituents of the mixture so long as the average number of carbon atoms per mol of solvent is about 6.5 to about 7. The most preferred class of mixed solvents are those in which the average composition constitutes a solvent with from about six to about seven carbon atoms per mol because these mixtures give the solvent the desired properties outlined above.

Although not alluded to in the description of the embodiment given, it will now be clear to those skilled in the art that once a highly economical means for extracting water from electrolyte solutions is available, its useful application will include not only the production of potable water, but also the concentration of various solutions and the production of concentrated liquors and salts thereby. Furthermore, it will now be seen that, with suitable withdrawal and auxiliary means added to the method described through the embodiments illustrated, separations may be economically performed between different solutes dissolved in water, by virtue of their differing distribution between water and solvents disclosed herein. The principal reason for the relative lack of industrial use of such solvent partition methods heretofore has been the expense involved in recovering the solvent therefrom. The process herein described offers an economical answer thereto.

Thus, it is evident that, while specific and preferred methods, apparatus and operating conditions have been described and illustrated above, the invention is not thus limited and, further, that other equivalent arrangements and conditions can be adopted within the sphere and scope of the invention, that the feed could be other than saline water, that only portions of the invention need to be used to secure important advantages over the prior art, and that the invention may be advantageously used for the removal of ions from liquids other than water.

Thus, even though perhaps less advantageous, certain elements may be eliminated or operated differently, some or all of the aspects may be employed in connection with other purposes, other equivalent elements may be used, combinations of elements other than those specifically illustrated may be adopted, and that quite different apparatus means may be used to accomplish aspects of the method.

For example, referring again to FIG. 1, it may be preferred for certain uses to introduce the vapors from line 14 into other portions of the process than that shown, e.g. condensing them into liquid in vessels 24, 5, 8, into combinations thereof, or into intermediate points, say line 10 before it joins line 39.

Furthermore, it will be preferred in the case where maximum concentration of an aqueous solution is desired, instead of a simple liquid-liquid contacting operation in vessel 24, to introduce a portion of the water extract stream in line 4 into vessel 24 and pass it in the same direction as the brine stream in lines 23 and 27 (but not in contact therewith). Vessel 24 would then preferably be constructed similarly to vessel 5 except it would have provisions for also liquid-liquid contacting on the side of the baffle (similar to baffle 41) which contains the countercurrently flowing brine and hot recirculated solvent. Vapors would successively pass from the hot solvent (which would not be large in proportion to the brine) to the water extract. It will now be seen that such a procedure is highly advantageous because: (1) it allows a relatively large quantity of (initially hot) solvent to contact the brine, thereby removing a relatively large amount of water therefrom during the cooling of the solvent and the heating of the brine; and (2) by vaporing water from these contacting phases, it still further concentrates the brine.

Thus, it is to be understood that the invention is not limited to specific embodiments thereof, except as defined in the appended claims.

I claim:

1. In a solvent extraction process which produces streams of lower and higher solute concentration from an aqueous solution by contacting said aqueous solution with a solvent to produce an extract stream and a residual raffinate stream, said solvent having the property of dissolving water at a first lower temperature and substantially releasing it at a second higher temperature without substantially extracting the solute from said aqueous solution, the improvement which comprises directly and countercurrently contacting said residual raffinate stream with said solvent under conditions whereby the initial temperature of said solvent is substantially higher than the initial temperature of said residual raffinate, thereby increasing the yield of said stream of lower concentration.

2. The process of claim 1 wherein said residual raffinate is contacted with said solvent in a plurality of stages of varying temperature and pressure.

3. The process of claim 1 wherein said residual raffinate stream, after contact with said solvent, is flashed to increase the concentration of said solute in said raffinate.

4. In a solvent extraction process which produces streams of lower and higher solute concentration in composition from an aqueous solution by contacting said aqueous solution with a solvent to produce an extract stream and a residual raffinate stream, said solvent having the property of dissolving water at a first lower temperature and substantially releasing it at a second higher temperature without substantially extracting the solute from said aqueous solution, the improvement which comprises heating said extract stream by condensing therein in a plurality of stages a vapor obtained by flashing at least one stream of a previously heated mixture comprising said solvent and water.

5. The process of claim 4 wherein
   (a) said extract stream is heated in a plurality of stages in each of which a small portion of an aqueous reflux phase more concentrated in said solute than is said extract separates from said extract
   (b) returning said reflux from a portion of said stages to a preceding stage.

6. The process of claim 4 wherein at least a portion of said vapor is produced from said raffinate by flashing thereof.

7. The process of claim 4 wherein said solvent comprises a weak organic base.

8. The process of claim 4 wherein said mixture comprising solvent and water is a water-rich mixture.

9. The process of claim 4 wherein said mixture comprising solvent and water is a solvent-rich mixture.

10. The process of claim 4 wherein
(a) said extract stream is heated in a plurality of stages by condensing in said extract in each stage vapors obtained by flashing previously heated streams comprising mixtures of water and said solvent;
(b) thus forming a small portion of an aqueous reflux phase more concentrated in said solute than is said extract at each stage;
(c) returning said reflux from each stage of a portion of said stages to a preceding stage;
(d) returning said reflux from the first of said stages to said aqueous solution for contacting with said solvent;
(e) treating said extract from the final stage in step (a) with hot vapor to form a final two phase mixture comprising solvent and water;
(f) separating said mixture from step (e) into water rich and solvent rich streams;
(g) forming said hot vapor for use in step (e) by treating at least a portion of said water rich stream from step (f) with steam, and
(h) separately returning said solvent rich and water rich phases into vapor contact with said extract thus removing solvent from said water to discharge said stream of lower solute concentration from said process and producing said solvent for contacting said raffinate.

11. An apparatus for producing vapors from a first liquid and condensing the vapors into a mixture of a second liquid and a third liquid in the presence of the simultaneous transfer of said second liquid and said third liquid countercurrently through a plurality of stages, said apparatus comprising a first zone for said first liquid, and a second zone for said second and third liquids, said second zone having vapor communication with said first zone, means for mixing said second and third liquids, means for settling and separating said second and third liquids in said second zone and means for transferring said liquids from stage to stage.

12. An apparatus for producing vapors from mixture of a first liquid and a second liquid and condensing the vapors into a third liquid in the presence of the simultaneous transfer of said second liquid and said first liquid countercurrently through a plurality of stages, said apparatus comprising a first zone for said mixture, and a second zone for said third liquid, said second zone having vapor communication with said first zone, means for mixing said first and second liquids, means for settling and separating said first and second liquids in said first zone and means for transferring said liquids from stage to stage.

13. In a solvent extraction process which produces streams of lower and higher solute concentration from an aqueous solution by contacting said aqueous solution with a solvent to produce an extract stream and a residual raffinate stream, said solvent having the property of dissolving water at a first lower temperature and substantially releasing it at a second higher temperature without substantially extracting the solute from said aqueous solution, the improvement which comprises heating said residual raffinate, flashing the thus heated raffinate stream, thereby producing vapors, condensing said vapors into a portion of said extract, thus heating said extract.

14. In a solvent extraction process which produces streams of lower and higher solute concentration from an aqueous solution by contacting said aqueous solution with a solvent to produce an extract stream and a residual raffinate stream, said solvent having the property of dissolving water at a first lower temperature and substantially releasing it at a second higher temperature without substantially extracting the solute from said aqueous solution, the improvement which comprises
(a) directly and countercurrently contacting said residual raffinate stream with said solvent under conditions whereby the initial temperature of said solvent is more than 50° F. higher than the initial temperature of said residual raffinate, thereby increasing the yield of said stream of lower concentration;
(b) said residual raffinate stream, after contact with said solvent, being flashed to increase the concentration of said solute in said raffinate;
(c) said extract stream being heated in a plurality of stages by condensing in said extract in each stage vapors obtained by flashing previously heated streams comprising mixtures of water and said solvent;
(d) thus forming a small portion of an aqueous reflux phase more concentrated in said solute than is said extract at each stage;
(e) returning said reflux from each stage of a portion of said stages to a preceding stage;
(f) returning said reflux from the first of said stages to said aqueous solution for contacting with said solvent;
(g) treating said extract from the final stage in step (c) with hot vapor to form a final two phase mixture comprising solvent and water;
(h) separating said mixture from step (g) into water rich and solvent rich streams;
(i) forming said hot vapor for use in step (g) by treating at least a portion of said water rich stream from step (h) with steam, and
(j) separately returning said solvent rich and water rich phases into vapor contact with said extract thus removing solvent from said water to discharge said stream of lower solute concentration from said process and producing said solvent for contacting said raffinate.

* * * * *